United States Patent
Cai et al.

(10) Patent No.: US 9,678,864 B2
(45) Date of Patent: Jun. 13, 2017

(54) DATA REALLOCATION UPON DETECTION OF ERRORS

(71) Applicant: Seagate Technology LLC, Cupertino, CA (US)

(72) Inventors: Jun Cai, Singapore (SG); AndiSumaryo Sutiawan, Singapore (SG); Jeetandra Kella, Singapore (SG); ChuanPeng Ong, Singapore (SG); Mark Allen Gaertner, Vadnais Heights, MN (US); Brian T. Edgar, Minneapolis, MN (US)

(73) Assignee: Seagate Technology LLC, Cupertino, CA (US)

( * ) Notice: Subject to any disclaimer, the term of this patent is extended or adjusted under 35 U.S.C. 154(b) by 21 days.

(21) Appl. No.: 14/559,327

(22) Filed: Dec. 3, 2014

(65) Prior Publication Data

US 2016/0162208 A1 Jun. 9, 2016

(51) Int. Cl.
*G06F 12/00* (2006.01)
*G06F 13/00* (2006.01)
(Continued)

(52) U.S. Cl.
CPC ...... *G06F 12/0246* (2013.01); *G06F 11/1016* (2013.01); *G06F 11/1072* (2013.01);
(Continued)

(58) Field of Classification Search
CPC ........ G06F 3/06; G06F 3/0614; G06F 3/0619; G06F 3/0655; G06F 3/0656;
(Continued)

(56) References Cited

U.S. PATENT DOCUMENTS

| 5,287,363 A * | 2/1994 | Wolf | G06F 11/076 |
| | | | 360/53 |
| 5,297,148 A * | 3/1994 | Harari | G06F 3/0601 |
| | | | 365/185.09 |

(Continued)

FOREIGN PATENT DOCUMENTS

GB 1381467 A * 1/1975 ........... G11B 20/182

OTHER PUBLICATIONS

Evaluation of a soft error tolerance technique based on time and/or space redundancy; Anghel et al; Proceedings of the 13th Symposium on Integrated Circuits and Systems Design; Sep. 18-24, 2000; pp. 237-242 (6 pages).*

(Continued)

*Primary Examiner* — Daniel C Chappell
(74) *Attorney, Agent, or Firm* — Westman, Champlin & Koehler, P.A.

(57) ABSTRACT

A device includes one or more data storage media having a main storage area, and includes a non-volatile cache memory and a controller. The controller stores a plurality of data packets into a plurality of physical locations in the main storage area. Each of the data packets is associated with a different logical block address (LBA), and each of the physical locations is associated with a different physical location address (PLA). The controller generates mapping information that links the different LBAs to the different PLAs. Upon detecting a soft error when reading a data packet stored in a physical location, the controller relocates the data packet associated with the soft error to a physical location of the non-volatile cache memory. The controller also marks the physical location as a suspect location. The controller updates the mapping information to reflect the relocation of the data packet associated with the soft error.

20 Claims, 6 Drawing Sheets

(51) Int. Cl.
*G06F 13/28* (2006.01)
*G06F 12/02* (2006.01)
*G06F 11/10* (2006.01)

(52) U.S. Cl.
CPC ............... *G06F 2206/1014* (2013.01); *G06F 2212/7201* (2013.01)

(58) Field of Classification Search
CPC .... G06F 3/0658; G06F 3/0659; G06F 3/0661; G06F 3/0671; G06F 3/0673; G06F 3/0674; G06F 3/0676; G06F 3/0679; G06F 3/068; G06F 3/0682; G06F 3/121; G06F 11/00; G06F 11/073; G06F 11/0751; G06F 11/08; G06F 11/085; G06F 11/10; G06F 11/1004; G06F 11/1008; G06F 11/1012; G06F 11/1016; G06F 11/102; G06F 11/1024; G06F 11/1028; G06F 11/1032; G06F 11/1036; G06F 11/104; G06F 11/1048; G06F 11/1064; G06F 11/1068; G06F 11/1072; G06F 11/14; G06F 11/1402; G06F 11/1446; G06F 11/16; G06F 11/1608; G06F 11/1629; G06F 11/1633; G06F 11/1637; G06F 11/1641; G06F 11/1645; G06F 11/165; G06F 11/1654; G06F 11/1666; G06F 11/167; G06F 11/18; G06F 11/186; G06F 11/20; G06F 11/2002; G06F 11/2005; G06F 11/2007; G06F 11/202; G06F 11/2023; G06F 11/203; G06F 11/02; G06F 12/00; G06F 12/02; G06F 12/0207; G06F 12/0215; G06F 12/0223; G06F 12/023; G06F 12/0238; G06F 12/0246; G06F 12/0253; G06F 12/0216; G06F 12/0269; G06F 12/0284; G06F 12/0292; G06F 12/06; G06F 12/08; G06F 12/0802; G06F 12/0806; G06F 12/0808; G06F 12/14; G06F 2201/00845; G06F 2201/88; G06F 2206/00; G06F 2206/10; G06F 2206/1014; G06F 2212/7201; G06F 2212/7202; G06F 2212/7203; G06F 2212/7204; G06F 2212/7209; G11B 20/18; G11B 20/1803; G11B 20/1833; G11B 2020/1836–2020/1863; G11C 29/00
USPC .......................................................... 711/103
See application file for complete search history.

(56) References Cited

U.S. PATENT DOCUMENTS

| | | | | |
|---|---|---|---|---|
| 5,559,958 A * | 9/1996 | Farrand | ............... | G06F 11/0709 709/223 |
| 5,974,544 A * | 10/1999 | Jeffries | ............... | G06F 11/1092 710/10 |
| 6,285,607 B1 * | 9/2001 | Sinclair | ............... | G11C 29/88 365/189.15 |
| 6,895,464 B2 * | 5/2005 | Chow | ............... | G06F 3/0616 365/185.33 |
| 7,350,046 B2 * | 3/2008 | Sicola | ............... | G06F 11/0727 711/111 |
| 7,490,261 B2 * | 2/2009 | Gaertner | ............... | G11B 20/18 714/6.13 |
| 7,603,530 B1 * | 10/2009 | Liikanen | ............... | G06F 11/2084 711/156 |
| 7,917,688 B2 * | 3/2011 | Tanaka | ............... | G06F 1/3225 711/103 |
| 7,934,052 B2 * | 4/2011 | Prins | ............... | G06F 13/1657 711/103 |
| 7,958,430 B1 * | 6/2011 | Kolokowsky | ............... | G06F 11/1068 714/763 |
| 7,996,710 B2 * | 8/2011 | Nagaraj | ............... | G06F 12/0246 711/100 |
| 8,028,119 B2 * | 9/2011 | Miura | ............... | G06F 11/1068 711/102 |
| 8,031,701 B2 | 10/2011 | Oran | | |
| 8,091,000 B2 * | 1/2012 | Chang | ............... | G06F 11/1024 711/3 |
| 8,271,831 B2 | 9/2012 | Elnozahy et al. | | |
| 8,321,625 B2 * | 11/2012 | Weingarten | ............... | G06F 12/0246 711/103 |
| 8,448,027 B2 | 5/2013 | Elnozahy et al. | | |
| 8,516,343 B2 | 8/2013 | Flynn et al. | | |
| 8,588,077 B2 | 11/2013 | Oran | | |
| 8,837,067 B2 | 9/2014 | Song | | |
| 9,032,244 B2 * | 5/2015 | Strauss | ............... | G06F 12/0246 714/6.13 |
| 9,229,854 B1 * | 1/2016 | Kuzmin | ............... | G06F 12/0246 |
| 9,400,749 B1 * | 7/2016 | Kuzmin | ............... | G06F 12/0246 |
| 9,442,799 B2 * | 9/2016 | Manasse | ............... | G06F 11/1076 |
| 2001/0024386 A1 * | 9/2001 | Harari | ............... | G06F 3/0614 365/200 |
| 2007/0011563 A1 * | 1/2007 | Tsang | ............... | H03M 13/2948 714/758 |
| 2007/0150774 A1 * | 6/2007 | Seng | ............... | G11B 20/1217 714/699 |
| 2007/0283193 A1 * | 12/2007 | Lewis | ............... | G06F 11/1064 714/48 |
| 2008/0010566 A1 * | 1/2008 | Chang | ............... | G06F 11/1024 714/718 |
| 2010/0122148 A1 | 5/2010 | Flynn et al. | | |
| 2011/0296228 A1 * | 12/2011 | Elnozahy | ............... | G06F 11/1497 714/2 |
| 2011/0296242 A1 | 12/2011 | Elnozahy et al. | | |
| 2013/0170060 A1 | 7/2013 | Johns et al. | | |
| 2013/0305086 A1 * | 11/2013 | Yulizar | ............... | G11B 20/10527 714/6.3 |
| 2013/0308433 A1 * | 11/2013 | Yulizar | ............... | G11B 27/36 369/53.41 |
| 2014/0095962 A1 * | 4/2014 | Moon | ............... | G06F 11/1048 714/773 |

OTHER PUBLICATIONS

Microarchitecture of HaL's memory management unit; Chang et al; Compcon '95 'Technologies for the Information Superhighway', Digest of Papers; Mar. 5-9, 1995; pp. 272-279 (8 pages).*

BulletProof: a defect-tolerant CMP switch architecture; Constantinides et al; The Twelfth International Symposium on High-Performance Computer Architecture; Feb. 11-15, 2006; pp. 3-14 (12 pages).*

The soft error problem: an architectural perspective; Mukherjee et al; Proceedings of the 11th International Symposium on High-Performance Computer Architecture; Feb. 12-16, 2005 (5 pages).*

* cited by examiner

Host Start LBA = LBA 0
Transfer Length = 3
Starting PBA = PBA 0

P2 { Host Start LBA = LBA 1
Transfer Length = 1
Starting PBA = PBA X

FIG. 2F

P1 { Host Start LBA = LBA 0
Transfer Length = 1
Starting PBA = PBA 0

P3 { Host Start LBA = LBA 2
Transfer Length = 1
Starting PBA = PBA 2

DATA REALLOCATION UPON DETECTION OF ERRORS

BACKGROUND

Data storage devices are used to access digital data in a fast and efficient manner. At a host level, user data are often structured in terms of variable length files, which can be constituted from one or more fixed-sized logical blocks (such as logical block addresses (LBAs)).

To store or retrieve user data with an associated data storage device, host commands are generally issued to the device using a logical block convention. The device links LBAs associated with host write commands to physical locations or blocks of media on which the data are to be stored. The device may also utilize LBAs to locate physical blocks from which the data are to be retrieved.

When the data storage device is characterized as a disc drive, a controller may be used to execute a seek command to move a data transducer or head adjacent a rotating recording disc and carry out the data transfer (i.e., read/write) operation with the associated physical block(s). Other types of data storage devices (for example, solid state data storage devices that have no moving parts) generally carry out other types of access operations to transfer the associated data.

Disc drives, for example, may encounter a read error during an attempt to read data from a location of the recording disc. Read errors may occur, for example, due to poor head placement during read operations, adjacent track interference/noise during read operations, poorly written data in the location of interest, foreign matter on the disc surface, a damaged or degraded region of the disc or the like. Upon detecting the read error, the disc drive may implement some sort of data and location repair procedure. Current repair procedures that target individual storage locations with defective data may be more suitable for disc drives that employ conventional recording techniques (for example, utilize non-overlapping tracks and permit sector/location-level random data updates) than for drives that utilize, for example, bands of partially overlapping tracks where individual locations of a band may not be randomly updated. Thus, there is a need for improvements in data error handling/management procedures. It is to these and other improvements that the present embodiments are generally directed.

SUMMARY

In a particular embodiment, a method is disclosed that includes storing a plurality of data packets into a plurality of physical locations in a main storage area of one or more data storage media. Each of the plurality of data packets is associated with a different logical block address (LBA), and each of the plurality of physical locations is associated with a different physical location address. The method also includes generating mapping information that links the different LBAs associated with the different data packets to the different physical location addresses associated with the different physical locations. Additionally, upon detecting a soft error when reading at least one data packet of the plurality of data packets stored in at least one physical location of the plurality of physical locations, the at least one data packet associated with the soft error is relocated to at least one physical location of a non-volatile cache memory. An indication is made that the at least one physical location of the plurality of physical locations is a suspect location. The mapping information is updated to reflect the relocation of the at least one data packet associated with the soft error to the at least one physical location in the non-volatile cache memory.

In another particular embodiment, a method is disclosed that includes detecting an error when reading a data packet stored in a non-volatile location of a data storage medium. The method also includes recovering the data packet from the non-volatile location and marking the non-volatile location as suspect. The method further includes relocating the data packet to a different non-volatile location, and updating mapping information to reflect the relocation.

In yet another particular embodiment, a device includes one or more data storage media having a main storage area. The device also includes a non-volatile cache memory and a controller. The controller stores a plurality of data packets into a plurality of physical locations in the main storage area of the one or more data storage media. Each of the plurality of data packets is associated with a different logical block address (LBA), and each of the plurality of physical locations is associated with a different physical location address. The controller generates mapping information that links the different LBAs associated with the different data packets to the different physical location addresses associated with the different physical locations. Upon detecting a soft error when reading at least one data packet of the plurality of data packets stored in at least one physical location of the plurality of physical locations, the controller relocates the at least one data packet associated with the soft error to at least one physical location of a non-volatile cache memory. The controller also makes an indication that the at least one physical location of the plurality of physical locations is a suspect location. The controller updates the mapping information to reflect the relocation of the at least one data packet associated with the soft error to the at least one physical location in the non-volatile cache memory.

DETAILED DESCRIPTION OF ILLUSTRATIVE EMBODIMENTS

The disclosure is generally related to data error handling/management in data storage devices such as hard drives, hybrid drives, and solid state drives.

A data storage device such as a disc drive may encounter a read error during an attempt to read data from, for example, a defective location of a recording disc. Errors/defects may be categorized as soft and hard errors/defects. Soft defects include errors where data may still be read correctly, but the quality of the signal representing the data may be below nominal values. Soft defects may be caused by phenomena such as side track erasure (STE), adjacent track interference, transient weak write, etc. In disc drives that employ conventional recording techniques (for example, utilize non-overlapping tracks for recording data), a soft defect may be repaired by scrubbing or refresh, which involves rewriting the data in the same location. However, in disc drives that employ, for example, discs on which data tracks are written in a partially-overlapping shingled pattern, with each successive track overwriting a portion of the previous track, rewriting data into a particular location may corrupt data in downstream tracks. Thus, to carry out a scrubbing operation in a disc drive in which such a shingled recording technique is used, an entire band of data tracks/locations may have to be rewritten. This may be relatively time-consuming and therefore inefficient. Thus, in one or more of the embodiments described in detail further below, instead of carrying out a band-level scrubbing operation, data from the defective location is relocated to a cache memory location, and mapping information is updated to reflect the relocation of that data. It should be noted that, in such embodiments, the location at which the soft error occurred is not marked/flagged as damaged and therefore data from subsequent write commands received in the data storage device may be stored at that location.

As noted above, in addition to soft errors/defects, certain other errors/defects may be categorized as hard errors/defects. A hard defect may be caused by effects such as a damaged or degraded region of the medium. Repairing a hard defect may involve moving/reallocating the data associated with defective media regions to a new location that may not be a cache memory location, but may be a location that is part of a main storage area of the device. Upon successful relocation, the defective region(s) may be marked/flagged so that no further data is allowed to be stored at the region.

Figure 1:
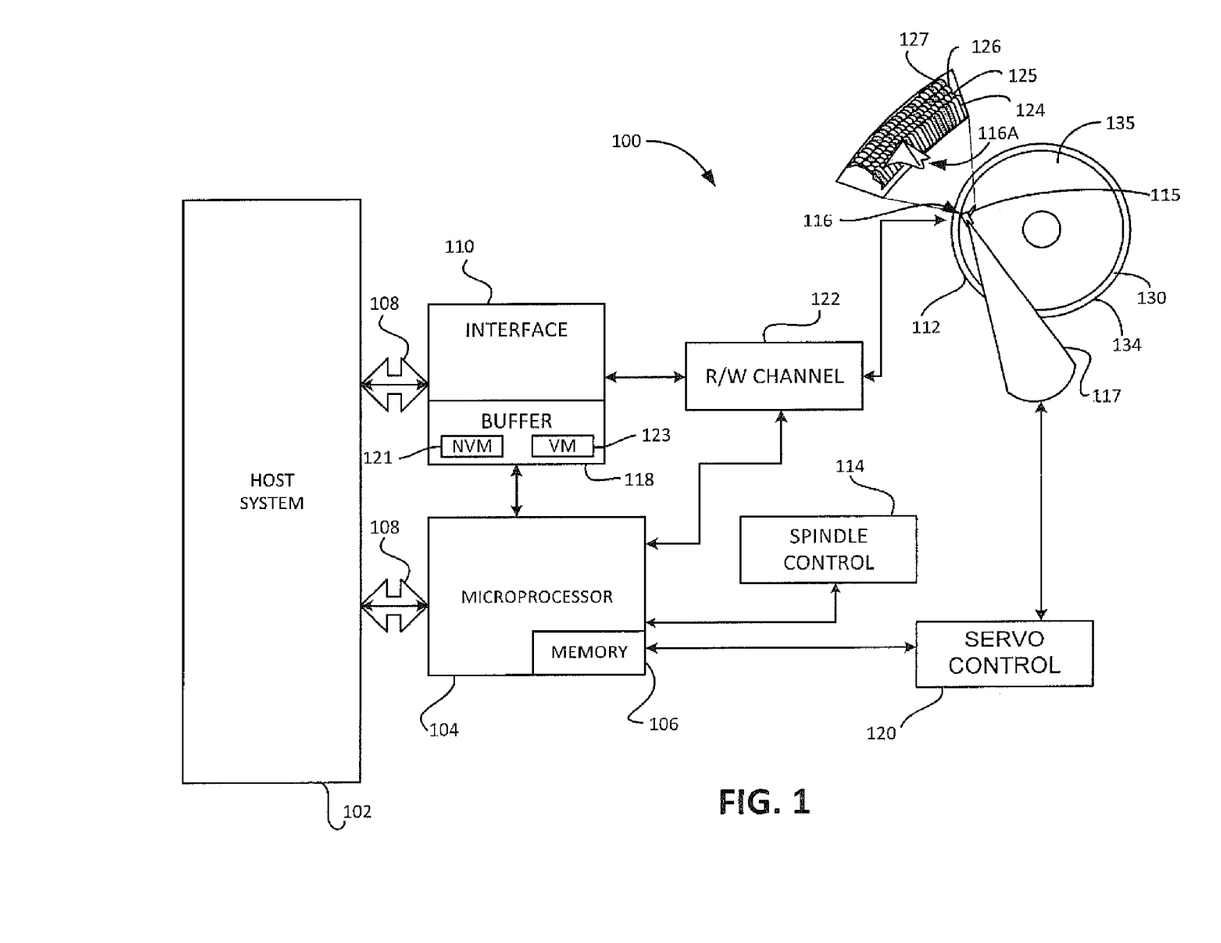
FIG. 1 is a block diagram of a data storage device in accordance with one embodiment.

FIG. 1 shows a block diagram of the disc drive 100 that employs a soft error/defect management system in accordance with one embodiment. As will be described in detail further below, disc drive 100 employs one or more discs on which multiple data tracks may be written in a partially-overlapping shingled pattern, with each successive track overwriting a portion of the previous track.

Disc drive 100 is shown in FIG. 1 to be operably connected to a host computer 102 in which disc drive 100 may be mounted. Control communication paths are provided between host computer 102 and a disc drive microprocessor 104, the microprocessor 104 generally providing top level communication and control for disc drive 100 in conjunction with programming for microprocessor 104 stored in microprocessor memory (MEM) 106. Disc drive 100 may communicate with host computer 102 using a bus 108. Bus 108 may not be a single physical object, but rather a collection of cabling/wiring, for example, that, taken together, make up a communication channel between host computer 102 and disc drive 100. As such, bus 108 carries the cables/wires used to transfer data between a disc drive interface 110 and host computer 102 as well as the cables/wires used to transfer data between microprocessor 104 and host computer 102.

MEM 106 can include random access memory (RAM), read only memory (ROM), and other sources of resident memory for microprocessor 104. Disc drive 100 includes one or more data storage discs 112. Discs 112 are rotated at a substantially constant high speed by a spindle control circuit 114. One or more heads 116 communicate with the surface(s) of discs 112 to carry out data read/write operations. The radial position of heads 116 is controlled through the application of current to a coil in an actuator assembly 117. A servo control system 120 provides such control.

As noted above, tracks may be written on one or more storage discs 112 in a partially-overlaying relationship. The overlaying of tracks is shown in close-up view of area 115 of disc(s) 112. In area 115, a corner of head 116A is shown writing a track portion 124. Different shading within the track portion 124 represents different magnetic orientations that correspond to different values of stored binary data. The track portion 124 is overlaid over part of track portion 125. Similarly, track portion 125 is overlaid over part of portion 126, portion 126 is overlaid over portion 127, etc.

The portions 124-127 may be part of what is referred to herein as a "band" which may include hundreds or thousands of similarly overlapping, concentric portions 124-127. Gaps are created between bands so that each band can be updated independently of other bands. The overlaying of successive track portions within a band in shingled magnetic recording (SMR) means that individual parts of the band may not be randomly updated on their own. This is because spacings between centers of track portions 124, 125, 126, 127, for example, are smaller than a width of a write pole (not separately shown) of head 116. However, a width of a reader (not separately shown) of head 116 may be small enough to read individual track portions 124, 125, 126, 127, thereby enabling random reads of data to be carried out.

In some embodiments, a portion of the media disc(s)) 112 may be reserved for use as a media cache 130, or locations for media cache 130 may be dynamically allocated from a pool of available locations on disc(s) 112. Thus, although media cache 130 is shown in FIG. 1 as being located proximate to an outer diameter 134 of disc(s) 112, in some embodiments, media cache 130 may include a variable number of disc storage locations that can be selected from any suitable area(s) of the disc(s) 112. Is should be noted that both main storage locations 135 and media cache locations may be selected/dynamically allocated from a pool of available locations on disc(s) 112. In some embodiments, media cache 130 may comprise shingled bands. In other embodiments, media cache 130 may be non-shingled (i.e., element 130 may include tracks that are each of a sufficiently large width relative to the width of the write pole of head 116 to allow the write pole to write data to individual ones of the tracks without overwriting data in any adjacent tracks).

Data is transferred between host computer 102 and disc drive 300 by way of disc drive interface 110, which may include a buffer 118 to facilitate high speed data transfer between host computer 102 and disc drive 100. In one embodiment, buffer 118 is constructed from solid-state components. While buffer 118 is depicted in FIG. 1 as being physically co-located with interface 110, one skilled in the art should appreciate that buffer 118 may be electrically connected, yet physically separated from interface 110. Also, although buffer 118 is shown as a single memory unit in FIG. 1, it can comprise multiple sections or even multiple memory chips with individual ones of the memory chips even being of different memory types. For example, buffer memory 118 can include a first section or first memory chip, which may be a non-volatile memory (NVM) 121, and a second section or second memory chip that may be a volatile memory (VM) 123. By employing NVM 121, which does not lose its data upon power loss, drive 100 may neglect to substantially immediately transfer data received from the sending interface to data storage medium 112. In general, disc drive 100 uses buffer 118 and media cache 130 to manage data transfers to and/or from main storage locations 135 on disc(s) 112.

Data to be written to disc drive 100 are passed from host computer 102 to buffer 118 and then to a read/write channel 122, which encodes and serializes the data and provides the requisite write current signals to heads 116. To retrieve data that have been previously stored by disc drive 100, read signals are generated by the heads 116 and provided to read/write channel 122. Interface 110 performs read signal decoding, error detection, and error correction operations. Interface 110 then outputs the retrieved data to buffer 118 for subsequent transfer to the host computer 102.

Disc drive 100 may encounter a read error during an attempt to read data from, for example, a defective one of main storage locations 135. With the help of microprocessor/controller 104, disc drive 100 may carry out a data recovery procedure, which may include determining whether the defect at the location is a soft defect or a hard defect. If the determination is that the error is due to a hard defect, the location at which the error occurred may be marked/flagged as damaged and may no longer be used for storing data. Any logical block address (LBA) mapping associated with that location is removed. However, if a determination is made that the error is due to a soft defect, the location is not marked/flagged as damaged and data recovered from that location may be relocated to a cache memory location. In one embodiment, the recovered data may be relocated to a location within media cache 130. In another embodiment, the recovered data may be relocated to a location within non-volatile memory 121. LBA mapping information that may be stored in non-volatile memory 121, media cache 130 and/or main storage 135 is updated to reflect the relocation of data from the particular one of main storage locations 135 at which the defect was detected to the location in media cache 130 or non-volatile memory 121. As indicated above, the particular one of main storage locations 135 at which the soft error occurred is not marked/flagged as damaged and therefore data from subsequent write commands received in disc drive 100 may be stored at that location. Example of error management in a disc drive such as 100 is provided below in connection with FIGS. 2A-2J.

Figure 2A:
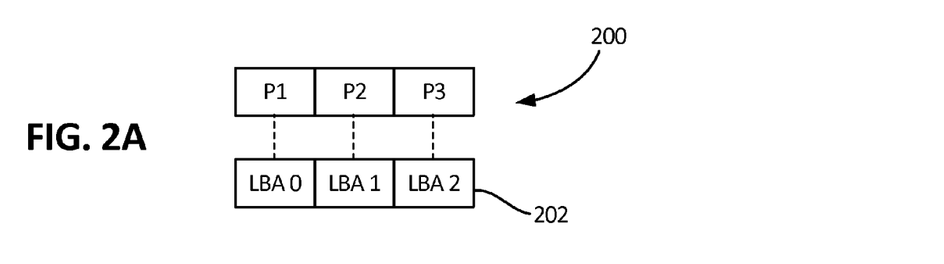
FIGS. 2A-2J are diagrammatic illustrations that include an example of soft error/defect management in accordance with an embodiment.
Figure 2B:
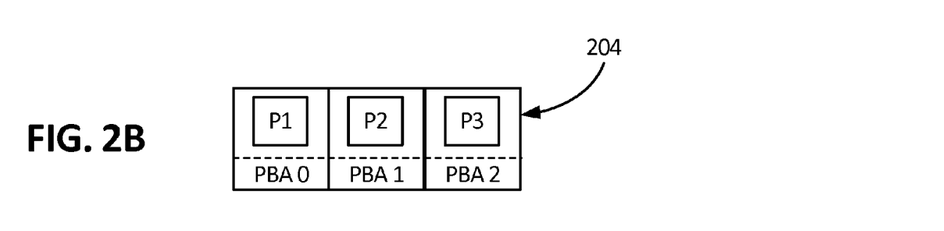
Figure 2C:
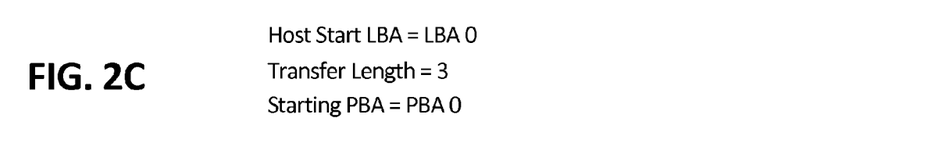

FIGS. 2A-2J are diagrammatic illustrations that show error management in accordance with some embodiments. FIG. 2A shows a host command 200 that includes data packets P1, P2 and P3, which are associated with host LBAs 0, 1 and 2, respectively. LBAs 0, 1 and 2 are collectively denoted by reference numeral 202. Packets P1, P2 and P3 may be stored in a main storage area 135 in a manner described above in connection with FIG. 1. In the particular example shown in FIG. 2B, packets P1, P2, P3 are stored in three physical locations 204 denoted by physical block addresses (PBAs) 0, 1 and 2, respectively. As shown in FIG. 2C, mapping information for packets P1, P2 and P3 of command 200 may include a host start LBA (LBA 0 for this example), a command length or transfer length (i.e., the number of LBAs in the command), which is 3 for this example, and the starting PBA (PBA 0 for this example). Alternatively, more than one LBA and/or PBA associated with the stored command may be included in the mapping information. If all LBAs and/or all PBAs associated with the stored packets (for example, P1, P2 and P3) are included in the mapping information, then the transfer length may be excluded.

Figure 2D:
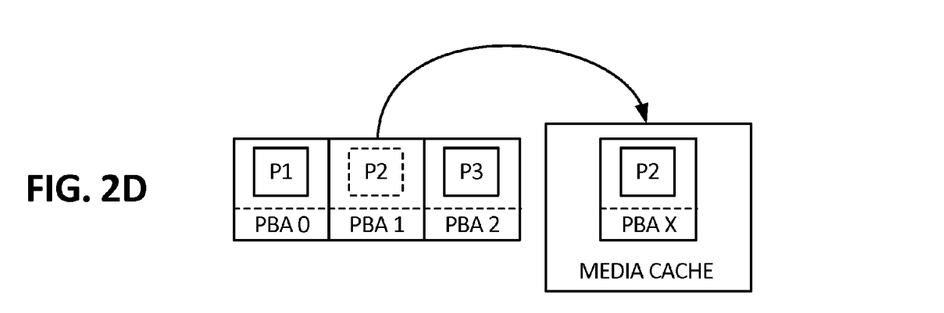
Figure 2E:
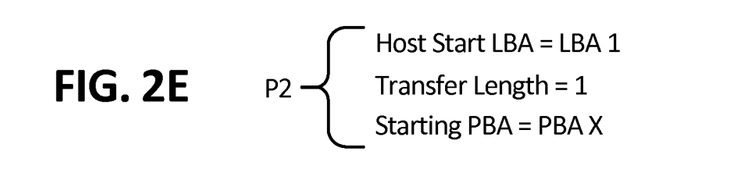
Figure 2F:
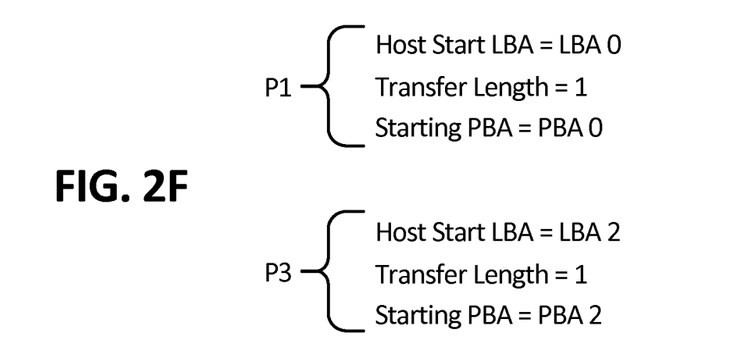

If, during a read operation from PBAs 0, 1 and 2, a soft error is detected, for example, at PBA 1, then P2 is relocated to a location within a media cache such as 130 or any other non-volatile cache/buffer storage location. FIG. 2D, shows packet P2 being relocated to a media cache location denoted by PBA X. FIG. 2E includes mapping information for relocated packet P2. In FIG. 2E, the host start LBA is LBA 1, the transfer length is 1 hand the starting PBA is PBA X. Mapping of packets P1 and P3 may also change due to the break in continuity of LBAs/PBAs used for storage of the command 200. An example of a change in mapping for packets P1 and P3 is shown in FIG. 2F.

As indicated above, data from subsequent write commands received in the storage device may be stored at PBA 1. If, in the example shown in FIG. 2A-2F, the relocation of packet P2 from PBA 1 as a result of a soft error being detected at that location is a first relocation from that PBA, then a relocation count (or soft reallocation count) associated with PBA 1 may be set to 1. The soft reallocation count for PBA 1 is incremented by 1 for each subsequent relocation of data from that location due to a soft error (i.e., for each subsequent soft reallocation). In some embodiments, if a soft reallocation count for a particular physical location crosses a predetermined soft reallocation count threshold, then that physical location is marked/flagged as damaged and no longer used for data storage.

Figure 2G:
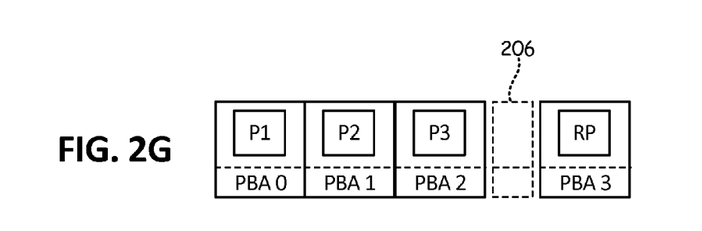

In some embodiments, an outer codeword may be generated to protect a plurality of packets received in the data storage device. In general, an outer codeword is a collection of packets that is resistant to damage. In some embodiments, an outer codeword is a collection of packets and redundancy that protects packets even in the face of losing one or more entire packets in the outer codeword. In such embodiments, an outer codeword redundancy, which is a part of the outer codeword, includes one or more packets or information that are not LBA data. The outer codeword redundancy may exist solely as redundancy to help the overall outer codeword survive damage. For example, an outer codeword or multi-packet codeword may be generated to protect packets P1, P2 and P3. FIG. 2G shows such an example in which packets P1, P2 and P3 are stored in PBAs 0, 1, 2, respectively, and the outer codeword redundancy, which is denoted by RP (redundancy packet), is stored in PBA 3. In a particular embodiment, P1, P2, P3 and RP may constitute the outer codeword. It should be noted that RP may be computed for a set of packets in which P1, P2 and P3 are a subset. In FIGS. 2G-2J, optional box 206 is used to denote any suitable number of additional packets that may also be under protection in the codeword. In the interest of simplification, the description below in connection with FIGS. 2G-2J does not address any additional packets 206.

Figure 2H:
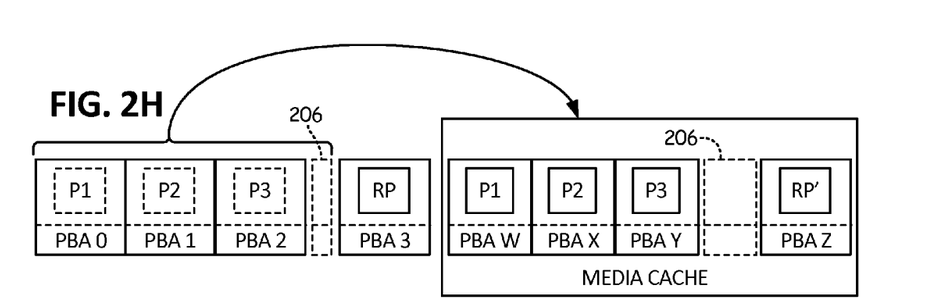

As described above, in a particular example, a read error is detected at PBA 1 during an attempt to retrieve packet P2. To protect any remaining valid (i.e., current version) data (for example, packets P1 and P2) protected by the outer codeword redundancy (for example, RP), all the valid data (for example, P1, P2 and P3) under protection is recovered and migrated (i.e., written) to one or more different non-volatile locations. FIG. 2H shows migration of packets P1, P2 and P3 to physical locations denoted by PBA W, PBA X and PBA Y, respectively, in media cache. As part of the migration, new outer codeword redundancy is optionally generated and employed at the new non-volatile packet locations. In FIG. 2H, the optional new codeword redundancy is denoted by RP' and is stored at a media cache location denoted by PBA Z. It should be noted that RP' may be an outer codeword redundancy that is generated to protect only P1, P2, and P3, or generated to protect any suitable number of packets that may include P1, P2 and P3. It should also be noted that the migration of the packets P1, P2, P3 may be a soft reallocation (i.e., PBAs 0, 1 and 2 may be used to store data from subsequent write commands received in the data storage device.) Also, since RP no longer serves as an outer codeword redundancy for P1, P2 and P3, data from subsequent write commands may be stored at PBA 3.

Figure 2I:
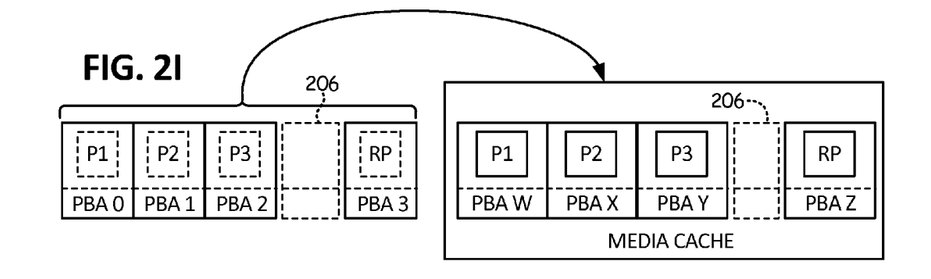

It should be noted that, in general, as error in one of multiple packets (for example, P2 of packets P1, P2 and P3)

protected by an outer codeword redundancy (such as RP) may result in the multi-packet codeword becoming suspect. In the example provided earlier in connection with FIGS. 2G and 2H, a condition of RP is disregarded because all valid data under protection (i.e., P1, P2 and P3) is migrated without RP, and RP' is generated and utilized at the new locations PBA W, PBA X and PBA Y. However, in some embodiments, to protect any remaining valid data (for example, packets P1 and P3) protected by the outer codeword redundancy, the entire codeword with its redundancy (for example, packets P1, P2, P3 and RP) is recovered and migrated to a different set of non-volatile locations. The migration of packets P1, P2, P3 and RP (i.e., migration of the entire codeword) in accordance with this example is shown in FIG. 2I.

Figure 2J:
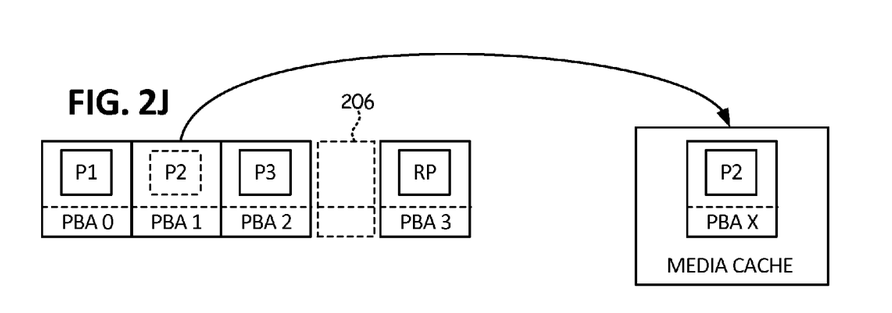

In an alternate embodiment, only the one or more suspect packets (for example, P2) of the multiple packets (for example, P1, P2 and P3) protected by the outer codeword redundancy (for example, RP) are migrated to one or more different non-volatile locations. To restore a prior level of confidence in the outer codeword redundancy (for example, RP), the new non-volatile location for the recovered packet (for example, P2) is chosen and managed such that the recovered data (for example, P2) in its new location retains its former participation in the multi-packet outer codeword despite its physical migration. FIG. 2J shows P2 being migrated to physical location PBA X in media cache without any changes being made to RP. Although the examples shown in FIGS. 2A-2J involve addressing a single suspect packet of multiple packets, the embodiments described above may apply to any number of suspect packets.

Figure 3:
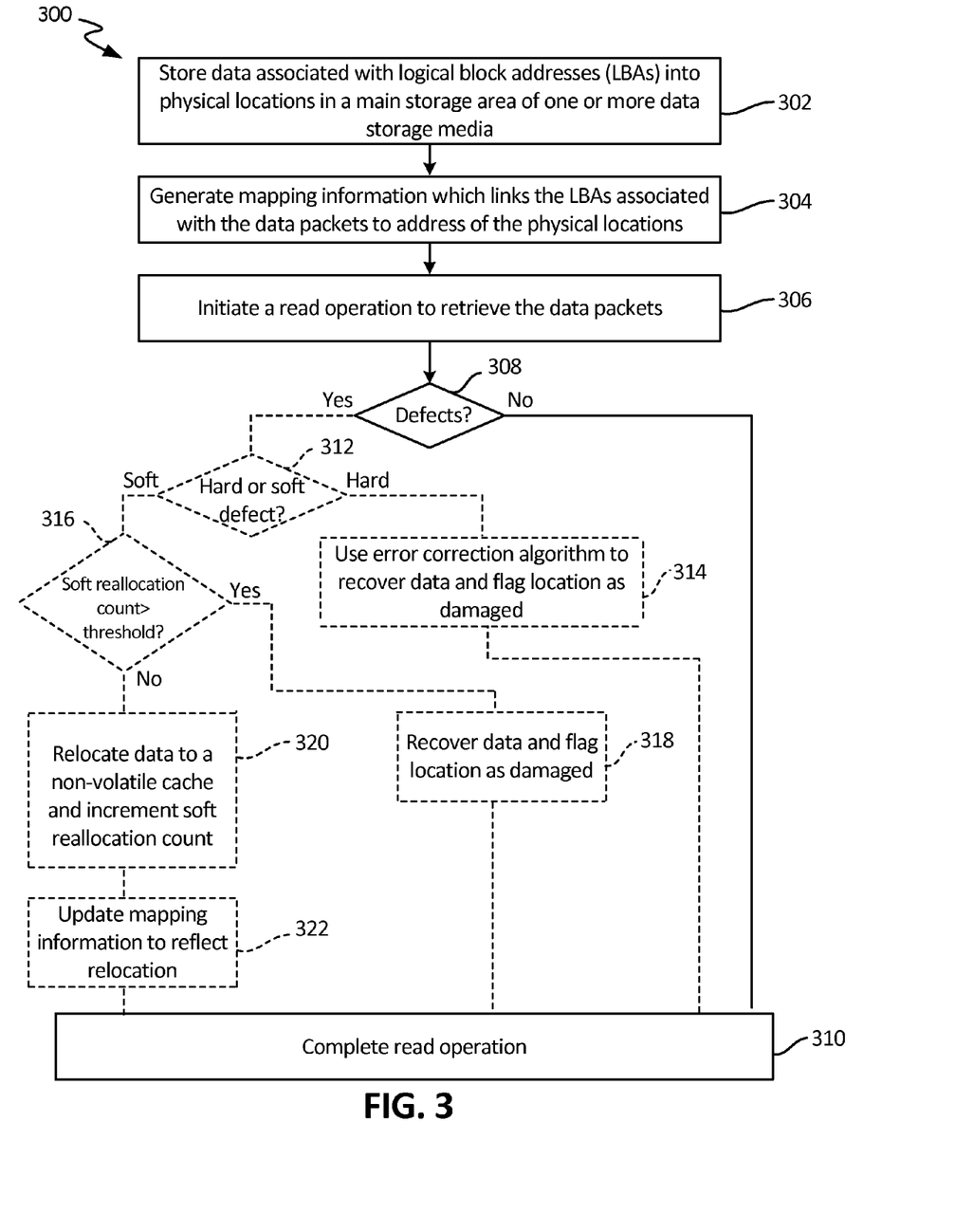
FIG. 3 is a flow diagram of an error/defect management method in accordance with one embodiment.

FIG. 3 is a flow diagram 300 of an error management method in accordance with one embodiment. The method includes, at step 302, storing data packets associated with logical block addresses into physical locations in a main storage area of one or more data storage media. At step 304, mapping information, which links the logical block addresses associated with the data packets to addresses of the physical locations, is generated. At step 306, a read operation is initiated to retrieve the data packets. At step 308, if no defects are encountered at any of the physical locations, control passes to step 310 at which the read operation is completed. If a defect is encountered at step 308, control passes to step 312 at which a determination is made as to whether the defect is a hard or soft defect. If the encountered defect is a hard defect, at step 314, error correction algorithms are used to attempt to recover the data, and the location at which the defect was encountered is marked/flagged as damaged. Control may then pass to step 310 at which the read operation is completed. If, at step 312, the encountered defect is a soft defect, control passes to step 316. At step 316, a determination is made as to whether a soft reallocation count (described above) for the physical location at which the soft error is detected is greater than a predetermined threshold. If the soft reallocation count is greater than the threshold, control moves to step 318 at which data is recovered and the location is marked/flagged as damaged and no longer used for data storage. Control may then pass to step 310 at which the read operation is completed. If, at step 316, the determination made is that the soft reallocation count is less than or equal to the threshold, control passes to step 320 at which the data packet associated with the soft error is relocated to a physical location of a non-volatile cache (for example, a media cache). Also, at step 320, the soft reallocation count for the physical location at which the soft error was detected is incremented by 1, for example. For a particular physical location, a soft reallocation count value between 1 and the reallocation count threshold, both inclusive, may indicate that the particular physical storage location is suspect, but not damaged. At step 322, the mapping information is updated to reflect relocation of the data packet associated with the soft error to the physical location in the non-volatile cache. The write operation is then completed at step 310. It should be noted that, although the above description in connection with FIG. 3 provides details regarding relocation of data from a single location in response to detecting a soft error/defect at that location, the same procedure described above may be repeated for any additional locations if soft errors/defects are encountered at multiple locations.

In FIG. 3, the section of the flowchart that includes steps 312-322 is shown using dashed lines because the collective functionality provided by those steps may be implemented in a data storage device such as a disc drive using any suitable technique/process. In general, when an error is encountered when reading a data packet at a physical storage location (or generally, a non-volatile location), a retrieval operation, which may require error recovery measures, may be carried out to successfully read the packet. The process may identify the physical storage location as suspect (for being damaged) and mark the physical storage location as such with the intent that the physical storage location will later be tested to determine whether it is actually damaged. The test may be carried out before that physical storage location is again relied upon to store information. Furthermore, the data packet that was read from the physical storage location is written to a different non-volatile location to protect it from the possibility that its former physical location is damaged. The migration of the packet to the non-volatile location may be temporary or permanent. In some embodiments, the migration is temporary when a determination is made that the physical location marked suspect is not damaged. Otherwise, the suspect location may be marked damaged.

As indicated earlier, in one embodiment, for a particular physical storage location, a soft reallocation count value between 1 and the soft reallocation count threshold, both inclusive, may indicate that the particular physical storage location is suspect, but not damaged. As noted above, in such an embodiment, if the soft reallocation count is greater than the soft reallocation count threshold, the particular physical location is marked/flagged as damaged. In different embodiments, different techniques may be used to mark a physical location as suspect and any suitable method may be utilized to determine whether the suspect location is damaged.

As noted above, when the suspect packet is part of a multi-packet outer codeword, in one embodiment, all valid data under protection by the outer codeword is recovered and migrated to one or more different non-volatile locations. In this embodiment, as part of the migration, new outer codeword redundancy is optionally generated and used at the new non-volatile locations. In another embodiment, the entire outer codeword with its redundancy is recovered and migrated to a different set of non-volatile packet locations. In yet another embodiment, to restore a prior level of confidence in the outer codeword, a new non-volatile location for the recovered packet is chosen such that the recovered data in its new location retains its former participation in the multi-packet outer codeword despite its physical migration.

The above-described embodiments may also be used in connection with relocating data from one media cache location at which a defect is detected when reading the data to another media cache location. In general, in different applications, the above-described embodiments may be applicable for use with storage locations of different types of storage media.

Figure 4:
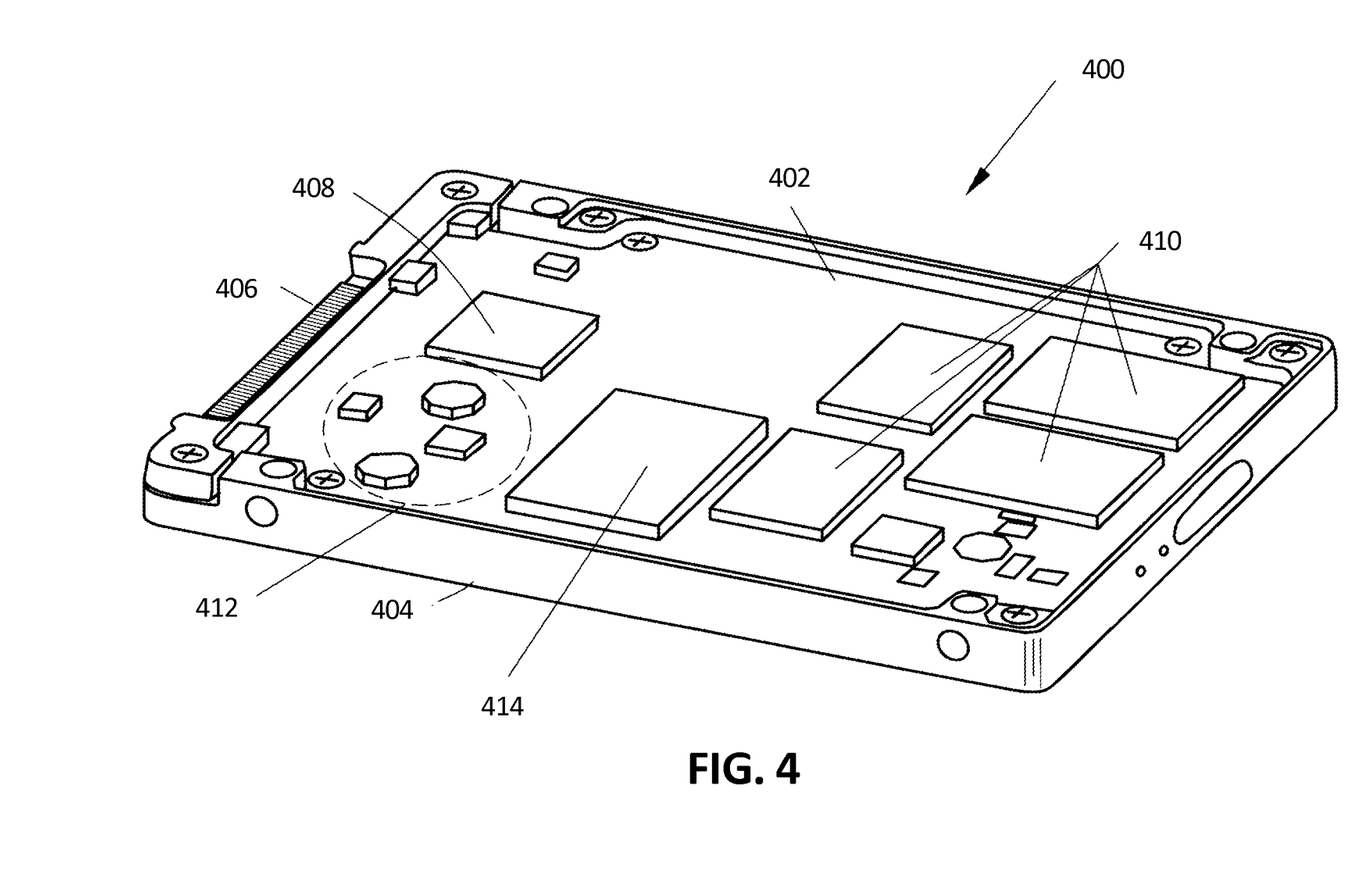
FIG. 4 is an isometric view of a solid-state drive that employs a soft error/defect management system in accordance with one embodiment.

FIG. 4 illustrates an oblique view of a solid state drive (SSD) 400 in which the presently disclosed methods described above in connection with FIG. 3, for example, are useful. SSD 400 includes one or more circuit card assemblies 402 and typically includes a protective, supportive housing 404, a top cover (not shown), and one or more interface connectors 406. SSD 400 further includes a controller ASIC 408, one or more non-volatile memory devices 410, and power regulation circuitry 412. The memory devices 410 are essentially the SSD's data storage media and non-volatile cache. In some applications, SSD 400 further includes a power-backup energy storage device, such as a super-capacitor 414.

In accordance with certain aspects, the SSD 400 includes a circuit card assembly 402 that includes a connector 406 for connection to a host computer. In accordance with certain aspects, the connector 406 includes a SAS, FC-AL, SCSI, PCI-E, IDE, AT, ATA, SATA, IEEE-1394, USB or other interface connector adapted for connection to a host.

If, as shown in FIG. 4, more than one non-volatile memory device 410 is included in SSD 400, then one of the non-volatile memory devices 410 may be used as the non-volatile buffer/cache. Physical storage locations (for example, erasure blocks) in the other one or more non-volatile memory devices 410 may be utilized as media cache and as main storage locations. In other embodiments, physical storage locations in the one or more non-volatile memory devices 410 may serve a pool of memory locations for assignment to main storage locations and to media cache locations.

As indicated above, instead of the physical storage locations being bands of the type described in connection with FIG. 1, SSD 400 includes erasure blocks that each comprise multiple pages. In other respects, the data management method used in SSD 400 may be similar to that described in connection with FIG. 1. Also, the read error management methods used in SSD 400 may be similar to those described in connection with FIGS. 2A-2J and 3. Therefore, to avoid repetition, a detailed description of read error management methods in SSD 400 is not provided.

In accordance with various embodiments, the methods described herein may be implemented as one or more software programs running on one or more computer processors or controllers, such as those included in devices 100 and 400. Dedicated hardware implementations including, but not limited to, application specific integrated circuits, programmable logic arrays and other hardware devices can likewise be constructed to implement the methods described herein.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description. It should be noted that at least some of the above-described embodiments may be employed in disc drives that include non-shingled main storage locations.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
   storing a plurality of data packets into a plurality of physical locations in a main storage area of one or more data storage media, wherein each of the plurality of data packets is associated with a different logical block address (LBA), and wherein each of the plurality of physical locations is associated with a different physical location address;
   generating mapping information that links the different LBAs associated with the different data packets to the different physical location addresses associated with the different physical locations;
   upon detecting a soft error when reading at least one data packet of the plurality of data packets stored in at least one physical location of the plurality of physical locations, relocating the at least one data packet associated with the soft error to at least one physical location of a non-volatile memory;
   when the soft error is detected, marking the at least one physical location of the plurality of physical locations as a suspect location, wherein the suspect location marking is indicative of an intent to carry out later-in-time damage testing of the at least one physical location, and wherein any determination as to whether the relocation of the at least one data packet to the at least one physical location in the non-volatile memory is temporary or permanent is deferred until after the later-in-time damage testing of the at least one physical location with the suspect location marking is carried out; and updating the mapping information to reflect the relocation of the at least one data packet associated with the soft error to the at least one physical location in the non-volatile memory.

2. The method of claim 1 and further comprising, upon detecting the soft error, incrementing a soft reallocation count of the at least one physical location of the plurality of physical locations, wherein the soft reallocation count is indicative of a number of data reallocations from the at least one physical location of the plurality of physical locations resulting from soft errors being detected at that physical location.

3. The method of claim 2 and further comprising flagging the at least one physical location of the plurality of physical locations as damaged if the soft reallocation count of the at least one physical location of the plurality of physical locations is greater than a predetermined soft reallocation count threshold.

4. The method of claim 1 and wherein the non-volatile memory is a media cache included in the one or more data storage media or a non-volatile memory that is of a different type than the one or more data storage media.

5. The method of claim 1 and wherein storing the plurality of data packets into the plurality of physical locations in the main storage area is carried out using a shingled magnetic recording technique.

6. The method of claim 1 and wherein the plurality of data packets is a part of a first outer codeword, and wherein the first outer codeword comprises the plurality of data packets and a first outer codeword redundancy.

7. The method of claim 6 and wherein the first outer codeword redundancy is stored in a physical location, in the main storage area, which is different from the plurality of physical locations at which the plurality of data packets is stored.

8. The method of claim 7 and further comprising, upon detecting a soft error when reading at least one data packet of the plurality of data packets stored in at least one physical location of the plurality of physical locations, relocating the plurality of data packets without the first outer codeword redundancy to a plurality of physical locations of the non-volatile memory.

9. The method of claim 8 and further comprising generating a second outer codeword redundancy for the plurality of data packets relocated to the non-volatile memory, the second outer codeword redundancy and the plurality of data packets comprising a second outer codeword.

10. The method of claim 7 and further comprising, upon detecting a soft error when reading at least one data packet of the plurality of data packets stored in at least one physical location of the plurality of physical locations, relocating the plurality of data packets and the first outer codeword redundancy to a plurality of physical locations of the non-volatile memory.

11. A method comprising:
detecting a soft error when reading a data packet stored in a non-volatile location of a data storage medium;
recovering the data packet from the non-volatile location;
when the soft error is detected, marking the non-volatile location as suspect, wherein the suspect location marking is indicative of an intent to carry out later-in-time damage testing of the non-volatile location;
when the soft error is detected, relocating the data packet to a different non-volatile location, wherein any determination as to whether the relocation of the data packet to the different non-volatile location is temporary or permanent is deferred until after the later-in-time damage testing of the non-volatile location with the suspect location marking is carried out; and
updating mapping information to reflect the relocation.

12. The method of claim 11 and further comprising carrying out the later-in-time damage testing of the non-volatile location marked as suspect to determine whether the suspect non-volatile location is damaged.

13. The method of claim 12 and further comprising storing a received data packet in the suspect non-volatile location if a determination is made that the suspect non-volatile location is not damaged.

14. The method of claim 11 and further comprising incrementing a soft reallocation count of the suspect non-volatile location, wherein the soft reallocation count is indicative of a number of data reallocations from the at least one physical location of the plurality of physical locations resulting from soft errors being detected at that physical location.

15. The method of claim 11 wherein the data storage medium comprises a main storage area having a plurality of main storage physical locations including the suspect non-volatile location, and wherein the different non-volatile location is one of a plurality of media cache locations, and wherein the data packet is one of a plurality of data packets protected by an outer codeword redundancy, and wherein the plurality of data packets and the outer codeword redundancy are stored in the plurality of main storage physical locations.

16. The method of claim 15 and further comprising relocating the plurality of data packets to at least some of the plurality of media cache locations.

17. The method of claim 15 and further comprising relocating only the data packet associated with the soft error to the different non-volatile location without relocating the remaining ones of the plurality of data packets and the outer codeword redundancy to the media cache such that a participation of the relocated data packet associated with the soft error in an outer codeword that comprises the plurality of data packets and the outer codeword redundancy is retained.

18. A device comprising:
one or more data storage media having a main storage area;
a non-volatile cache memory; and
a controller configured to:
store a plurality of data packets into a plurality of physical locations in the main storage area of the one or more data storage media, wherein each of the plurality of data packets is associated with a different logical block address (LBA), and wherein each of the plurality of physical locations is associated with a different physical location address;
generate mapping information that links the different LBAs associated with the different data packets to the different physical location addresses associated with the different physical locations;
upon detecting a soft error when reading at least one data packet of the plurality of data packets stored in at least one physical location of the plurality of physical locations, relocate the at least one data packet associated with the soft error to at least one physical location of a non-volatile memory;

when the soft error is detected, mark that the at least one physical location of the plurality of physical locations as a suspect location, wherein the suspect location marking is indicative of an intent to carry out later-in-time damage testing of the at least one physical location;

update the mapping information to reflect the relocation of the at least one data packet associated with the soft error to the at least one physical location in the non-volatile memory; and determine as to whether the relocation of the at least one data packet to the at least one physical location in the non-volatile memory is temporary or permanent after the later-in-time damage testing of the at least one physical location with the suspect location marking is carried out.

19. The device of claim 18 and wherein the controller is further configured to, upon detecting the soft error, increment a soft reallocation count of the at least one physical location of the plurality of physical locations, wherein the soft reallocation count is indicative of a number of data reallocations from the at least one physical location of the plurality of physical locations resulting from soft errors being detected at that physical location.

20. The device of claim 19 and wherein the controller is further configured to flag the at least one physical location of the plurality of physical locations as damaged if the soft reallocation count of the at least one physical location of the plurality of physical locations is greater than a predetermined soft reallocation count threshold.

* * * * *